3,071,506
METHOD OF CONTROL OF FUNGAL ORGANISMS WITH PHENOXATHIIN-10-OXIDE COMPOUNDS
Richard H. Gruenhagen, Blacksburg, Va., assignor to The Dow Chemical Company, Midland, Mich., a corporation of Delaware
No Drawing. Filed Nov. 30, 1960, Ser. No. 72,574
7 Claims. (Cl. 167—33)

This invention is concerned with fungicides and is particularly directed to compositions and methods for the control of fungal organisms.

It is an object of the present invention to provide a new method for the control of many common fungi. A further object of the present invention is the provision of an improved method wherein novel compositions are employed for fungus control. An additional object is to provide a composition which is adapted to be applied to the aerial portions of plants for the control of plant fungi without substantial injury to the plant foliage. Additional objects will become apparent from the following specification and claims.

In accordance with the invention, it has been discovered that certain substituted phenoxathiin-10-oxides are adapted to be employed for the control of a wide range of fungi. These compounds have the formula

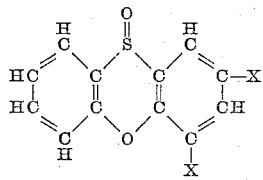

in which one X is hydrogen and the other X is either halogen or a cycloalkyl or alkyl radical containing from 1 to 20 carbon atoms. The compounds are readily soluble in many organic solvents and are of low solubility in water. They are adapted readily and conveniently to be employed for the control of many fungal organisms and particularly those organisms ordinarily found on the aerial portions of plants. The compounds may also be applied in dormant applications to the woody surfaces of plants or to orchard floor surfaces for the control of the overwintering spores of many fungi. It is an advantage of the present invention that compositions containing these compounds may be applied to growing vegetation in amounts required for effective control without significant injury to the plants. It is a further advantage that a single application of the compounds will provide a residual and extended control of fungi over a period of several months.

In carrying out the method of the present invention the undesirable fungal organisms may be controlled by contacting the organisms and/or their habitats with a fungicidal amount of the substituted phenoxathiin-10-oxide. However, the present invention also embraces the employment of a liquid, powder or dust composition containing one or more of the toxicants. Such compositions are adapted to be applied to the living plants without substantial injury to the plants. In preparing toxicant compositions, the phenoxathiin compounds may be modified with one or more of a plurality of additaments including organic solvents, petroleum distillates, water or other liquid carriers, surface active dispersing agents and finely divided inert solids. Depending upon the concentration in the composition of the phenoxathiin product, such augmented compositions are adapted to be employed for the control of the undesirable fungi or employed as concentrates and subsequently diluted with additional inert carrier to product the ultimate treating compositions.

In compositions to be employed as concentrates, the phenoxathiin toxicants often times are present in a concentration from about 5 to 98 percent by weight.

The exact concentration of the phenoxathiin employed in the compositions for application to the fungal organisms and/or their habitats may vary provided a fungicidal dosage of toxicant is applied either on the organism or its environment. This dosage of toxicant is primarily dependent upon the susceptibility of the particular organism to the phenoxathiin product. In general, good results are obtained with liquid compositions containing from about 0.001 to 2.0 percent by weight of toxicant, although compositions containing as much as 50 percent by weight may be applied to orchard floor surfaces for the control of spores. With dusts, good results are obtained with compositions containing from 0.01 to 5.0 percent or more by weight of toxicant. Where the compositions are to be applied to living plants, it is preferred that the toxicant be present in an amount not to exceed about 0.8 percent in liquid compositions and 1.0 percent in dusts. In terms of acreage application, good controls of fungal organisms are obtained when the phenoxathiin compounds are applied to plots of growing plants at a dosage of from $\frac{1}{64}$ to 3 pounds per acre.

In the preparation of dust compositions, the toxicant products may be compounded with any of the finely divided solids such as pyrophyllite, talc, chalk, gypsum and the like. In such operations, the finely divided carrier is ground or mixed with the toxicant or wet with a solution of the toxicant in a volatile organic solvent. Similarly, dust compositions containing the products may be compounded with various solid surface-active dispersing agents, such as fuller's earth, bentonite, attapulgite and other clays. Depending upon the proportions of ingredients, these dust compositions may be employed as concentrates and subsequently diluted with an additional solid surface-active dispersing agent or with pyrophyllite, chalk, talc, gypsum and the like to obtain the desired amount of active ingredient in a composition adapted to be employed for the control of fungi. Also, such concentrate dust compositions may be dispersed in water, with or without the aid of dispersing agents to form spray mixtures.

Further, the phenoxathiin compounds or a liquid or dust concentrate composition containing such compounds may be incorporated in intimate mixture with surface-active dispersing agents such as ionic and non-ionic emulsifying agents to form spray concentrates. Such concentrates are readily dispersible in liquid carriers to form sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the toxicant products may be compounded with a suitable water-immiscible organic liquid and a surface-active dispersing agent to produce emulsifiable concentrates which may be further diluted with water and oil to form spray mixtures in the form of oil-in-water emulsions. In such compositions, the carrier comprises an aqueous emulsion, i.e., a mixture of water-immiscible solvent, emulsifying agent and water. Preferred dispersing agents which may be employed in these compositions are oil-soluble and include the non-ionic emulsifiers such as the condensation products of alkylene oxides with the inorganic acids, polyoxyethylene derivatives of sorbitan esters, complex ether alcohols and the like. However, oil-soluble ionic emulsifying agents such as mahogany soaps may also be used. Suitable organic liquids which may be employed in the composition include petroleum oils and distillates, toluene, liquid halohydrocarbon and synthetic organic oils. The surface-active dispersing agents are usually employed in liquid compositions in the amount of from 1 to 20 percent by weight of the combined weight of the dispersing agent and active compound.

When operating in accordance with the present invention, the phenoxathiin compounds or a composition containing the compounds may be applied to the fungal organisms to be controlled, or to their habitats in any convenient fashion, e.g., by means of hand dusters or sprayers. Applications to the above-ground portions of plants conveniently may be carried out with powder dusters, boom sprayers and spray dusters. In foliar applications, the employed compositions should not contain any appreciable amount of phytotoxic diluents. In large scale operations, dusts or low volume sprays may be applied from airplanes.

The following examples illustrate the present invention but are not to be construed as limiting its scope.

*Example 1*

Twenty-five parts by weight of 2-chloro-phenoxathiin-10-oxide is mixed and ground with 71 parts of fuller's earth, 2 parts of an alkyl aryl sulfonate (Nacconol NR) and 2 parts of a substituted benzoic alkyl sulfonic acid (Daxad No. 27) to prepare a concentrate composition in the form of a wettable powder. In a similar manner, other phenoxathiin concentrate compositions are prepared by employing one of the following in place of the 2-chloro-phenaxothiin-10-oxide:
4-chloro-phenoxathiin-10-oxide
2-ethyl-phenoxathiin-10-oxide
2-(1-ethyl-1-methyl-pentyl)-phenoxathiin-10-oxide
2-dodecyl-phenoxathiin-10-oxide
2-heptadecyl-phenoxathiin-10-oxide
2-bromo-phenoxathiin-10-oxide
4-bromo-phenoxathiin-10-oxide In a like manner, a wettable powder concentrate composition is prepared by mixing and grinding together 25 parts by weight of 2-cyclopentyl-phenoxathiin-10-oxide, 16.5 parts of zinc sulfate, 2 parts of an alkyl aryl sulfonate (Nacconol NR), 2 parts of Daxad No. 27 and 54.5 parts of fuller's earth.

Also, 90 parts by weight of 2-sec. butyl-phenoxathiin-10-oxide and 10 parts by weight of a sorbitan monolaurate poyloxyethylene derivative (Tween 20) are mixed together to prepare a water-dispersible concentrate composition. In a similar manner, other water-dispersible concentrates are prepared by employing one of the following in place of the 2-sec. butyl-phenoxathiin-10-oxide:
4-methyl-phenoxathiin-10-oxide
4-ethyl-phenoxathiin-10-oxide
2-isopropyl-phenoxathiin-10-oxide
4-isopropyl-phenoxathiin-10-oxide
4-sec. butyl-phenoxathiin-10-oxide
2-eicosyl-phenoxathiin-10-oxide These concentrate compositions are adapted to be dispersed in water to provide aqueous compositions having very desirable wetting properties. The latter aqueous compositions are useful for the distribution of the phenoxathiin compounds in fungicidal amounts.

*Example 2*

A water-dispersible concentrate composition was prepared by mixing and grinding together in a ball-mill 0.06 part by weight of 2-chloro-phenoxathiin-10-oxide, 0.06 part of an alkyl aryl sulfonate (Nacconol NR) and 0.06 part of Daxad No. 27 and 200 parts of water. A portion of this concentrate was diluted with water to form aqueous spray compositions containing from ¼ to 1/32 pound of the phenoxathiin compound per 100 gallons of ultimate composition.

The latter spray compositions were sprayed with an atomizing spray nozzle using air pressure at 20 pounds per square inch on young tomato plants 3 to 5 inches high. The applications were carried out so as to give thorough coverage of all surfaces of the leaves of the plants without appreciable run off. Following the application, the spray composition was allowed to dry upon the leaf surfaces and the plants then inoculated by spraying with an aqueous suspension of viable spores of *Alternaria solani*, the casual organism of tomato early blight. Untreated tomato plants were similarly inoculated to serve as checks. Immediately following the inoculation, all plants were placed in a moist chamber and maintained at 70° F. under saturated humidity conditions for 24 hours. Thereafter, the plants were placed in a shaded greenhouse for 48 hours and then observed for lesions caused by the blight organism. The dosages at which the phenoxathiin compound was employed together with the results of the observations expressed as percent kill of *Alternaria solani* are set forth in the following table:

| Concentration of 2-chloro-phenoxathiin-10-oxide in lbs./100 gals. of spray composition | Percent kill of *Alternaria solani* |
| --- | --- |
| 1/4 | 100 |
| 1/32 | 95 |

At the time of the observations, the check plants were found to be heavily covered with lesions attributable to *Alternaria solani*.

*Example 3*

Concentrate compositions were prepared in the manner described in Example 2 from various substituted phenoxathiin-10-oxide compounds, and the concentrates dispersed in water to produce aqueous compositions containing from 1/32 to ¼ pound of the active agent per 100 gallons of ultimate composition. These compositions were employed exactly as described in Example 2 for the control of *Alternaria solani*. The phenoxathiin compounds evaluated in this manner, the dosages employed, and the results obtained are set forth in the following table:

| Compound | Amount in lbs./100 gals. of spray composition | Percent kill of *Alternaria solani* |
| --- | --- | --- |
| 2-cyclohexyl-phenoxathiin-10-oxide | 1/16 | 99 |
| 4-cyclohexyl-phenoxathiin,10-oxide | 1/16 | 81 |
| 2-methyl-phenoxathiin-10-oxide | 1/4 | 100 |
| 2-tert. butyl-phenoxathiin-10-oxide | 1/32 | 99 |

At the time of the observations, the check plants were found to be heavily covered with lesions attributable to *Alternaria solani*.

*Example 4*

A water-dispersible concentrate composition was prepared by mixing and grinding together in a ball-mill 0.24 part by weight of 2-tert. butyl-phenoxathiin-10-oxide, 0.06 part Daxad 27, 0.06 part Nacconol NR and 200 parts of water. A portion of this concentrate composition was dispersed in water to prepare an aqueous spray composition containing ¼ pound of the phenoxathiin compound per 100 gallons of ultimate mixture. The spray composition was sprayed through an atomizing nozzle using a pressure of 20 pounds per square inch on stands of wheat in the early two-leaf stage. The applications were carried out so as to give thorough coverage of all surfaces of the plants. Twenty-four hours following the applications, the plants were inoculated with an aqueous suspension of the spores of *Puccinia rubigo-vera*, an organism causing wheat rust. Untreated stands of wheat in the early two-leaf stage were similarly inoculated to serve as checks. Immediately following the inoculation, all plants were placed in a moist chamber and maintained at 40° F. under saturated humidity conditions for 24 hours. Thereafter, the plants were placed in a greenhouse for ten days and then observed for the development of wheat rust. The plants treated with the phenoxathiin compound were observed to have a 97 percent kill of wheat rust. At the time of the observation, the check plants were heavily infested with wheat rust.

*Example 5*

The spray composition prepared in Example 4 was also employed for the control of *Erysiphe cichoracearum*, an organism causing powdery mildew on cucumber plants. The spray composition was sprayed on cucumber plants through an atomizing nozzle using a pressure of 20 pounds per square inch. The applications were carried out so as to give thorough coverage of all surfaces of the plants. After the spray deposit had dried, the plants were inoculated with spores of *Erysiphe cichoracearum*. Untreated cucumber plants were similarly inoculated to serve as checks. After 14 days in a greenhouse, the plants were observed for the development of powdery mildew. The plants treated with the phenoxathiin compound were observed to have a 90 percent kill of powdery mildew. At the time of the observation, the check plants were heavily infested with powdery mildew.

*Example 6*

A portion of water-dispersible concentrate composition containing 0.50 part by weight of 2-chloro-phenoxathiin-10-oxide, 2 parts of Nacconol NR and 2 parts of Daxad No. 27 are dispersed in water to prepare an aqueous spray composition containing one pound of the phenoxathiin compound per 100 gallons of ultimate mixture. This composition is applied in an apple orchard to the trunks and branches of dormant trees and to the ground floor beneath the trees for the control of the overwintering spores of apple scab. The application is carried out with conventional spraying equipment, the spray composition being applied to the trees in an amount sufficient to provide for appreciable run off. Unsprayed check trees are maintained in the orchard to provide for a continuous source of reinfestation. Six weeks following bloom, the trees are examined and compared with the untreated check trees to determine what control of apple scab had been obtained. As a result of the observations, there is found a commercial control of apple scab with heavy infestation on the untreated checks.

The substituted phenoxathiin-10-oxides employed in this invention are white crystalline compounds or viscous oils, not very soluble in water and somewhat soluble in common organic solvents. They are prepared by oxidizing the corresponding substituted phenoxathiin compounds. This may be accomplished by dissolving the latter in glacial acetic acid and treating the solution with an equivalent amount of hydrogen peroxide. The substituted phenoxathiin compounds employed as intermediates in the preparation of the oxides may be prepared by the reaction of the corresponding substituted diphenyloxide with sulfur in the presence of aluminum chloride as a catalyst. Alternatively, the substituted phenoxathiin compounds may be prepared by reacting phenoxathiin, in the presence of a Lewis acid catalyst, with an olefin corresponding to the desired substituent.

I claim:

1. A method which comprises applying to fungal organisms a fungicidal amount of a compound having the formula

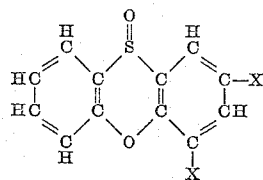

wherein one X is hydrogen and the other X is a member of the group consisting of halogen, cyclopentyl, cyclohexyl and alkyl containing from 1 to 20 carbon atoms.

2. The method according to claim 1 wherein said compound is employed in the form of a composition comprising said compound in intimate admixture with a parasiticide adjuvant as a carrier thereof.

3. The method according to claim 1 wherein said compound is 2-chloro-phenoxathiin-10-oxide.

4. The method according to claim 1 wherein said compound is 2-cyclohexyl-phenoxathiin-10-oxide.

5. The method according to claim 1 wherein said compound is 4-cyclohexyl-phenoxathiin-10-oxide.

6. The method according to claim 1 wherein said compound is 2-methyl-phenoxathiin-10-oxide.

7. The method according to claim 1 wherein said compound is 2-tert. butyl-phenoxathiin-10-oxide.

References Cited in the file of this patent

UNITED STATES PATENTS

| | | |
|---|---|---|
| 2,049,725 | Smith | Aug. 4, 1936 |
| 2,265,204 | Smith et al. | Dec. 9, 1941 |
| 2,265,205 | Smith et al. | Dec. 9, 1941 |
| 2,423,457 | Lynn et al. | July 8, 1947 |